(12) United States Patent
Burk et al.

(10) Patent No.: US 9,943,029 B2
(45) Date of Patent: Apr. 17, 2018

(54) AUTOMATED DEPTH CONTROL ADJUSTMENT SYSTEM FOR SEED PLANTER

(71) Applicant: STEERING SOLUTIONS IP HOLDING CORPORATION, Saginaw, MI (US)

(72) Inventors: Matt R. Burk, Bay City, MI (US); Nicholas R. Alpers, Saginaw, MI (US); David L. Westphal, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 53 days.

(21) Appl. No.: 15/142,641

(22) Filed: Apr. 29, 2016

(65) Prior Publication Data

US 2016/0316614 A1 Nov. 3, 2016

Related U.S. Application Data

(60) Provisional application No. 62/155,063, filed on Apr. 30, 2015.

(51) Int. Cl.
*A01C 7/20* (2006.01)
*A01B 63/00* (2006.01)

(52) U.S. Cl.
CPC ............ *A01C 7/203* (2013.01); *A01B 63/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,249,630 A * | 7/1941 | James | ................... | A01B 63/26 172/462 |
| 4,413,685 A * | 11/1983 | Gremelspacher | ...... | A01B 63/22 111/14 |
| 4,580,507 A * | 4/1986 | Dreyer | .................. | A01B 61/046 111/150 |
| 7,032,527 B2 * | 4/2006 | Friesen | .................. | A01C 7/208 111/18 |
| 2006/0272833 A1 * | 12/2006 | Ripple | .................... | A01C 7/203 172/2 |
| 2011/0247843 A1 * | 10/2011 | Whalen | ................ | A01B 63/008 172/315 |
| 2014/0262377 A1 * | 9/2014 | Winick | ................ | A01B 63/008 172/315 |

* cited by examiner

*Primary Examiner* — Alicia Torres
(74) *Attorney, Agent, or Firm* — Cantor Colburn LLP

(57) ABSTRACT

An automated depth control adjustment assembly for a seed planter includes an adjustable mechanism. Also included is a beam arrangement operatively coupled to the adjustable mechanism and adjustable upon manipulation of the adjustable mechanism. Further included is an electric motor operatively coupled to the adjustable mechanism to drive the adjustable mechanism, manipulation of the adjustable mechanism adjusting the beam arrangement to control seed planting depth.

23 Claims, 3 Drawing Sheets

AUTOMATED DEPTH CONTROL ADJUSTMENT SYSTEM FOR SEED PLANTER

CROSS REFERENCE TO RELATED APPLICATION

This patent application claims priority to U.S. Provisional Patent Application Ser. No. 62/155,063, filed Apr. 30, 2015, which is incorporated herein by reference in its entirety.

BACKGROUND OF THE INVENTION

The embodiments described herein relate to a seed planter and, more particularly, to an automated depth control adjustment system for such seed planters.

Conventional planting implements currently used farming, commonly referred to as "planters," utilize a seed channel opener, typically in the form of a disc, that creates a channel or furrow in the soil for seed placement. Due to varying soil conditions of a field being planted, as well as different depths for different types of seeds being planted, it is desirable to adjust a mechanism that assists in controlling the seed planting depth achieved during a planting operation by moving a hard stop feature that limits seed planting depth.

Adjustment of the mechanism requires manual adjustment by an operator. For example, an operator must exit a tractor to go to each individual planter row unit to manually set the depth for each row unit. This adjustment system undesirably leads to costly wasted time by the operator. Furthermore, the adjustment of the mechanism is subject to operator error, particularly as the operator becomes fatigued throughout the planting operation.

SUMMARY OF THE INVENTION

According to one aspect of the disclosure, an automated depth control adjustment assembly for a seed planter includes an adjustable mechanism. Also included is a beam arrangement operatively coupled to the adjustable mechanism and adjustable upon manipulation of the adjustable mechanism. Further included is an electric motor operatively coupled to the adjustable mechanism to drive the adjustable mechanism, manipulation of the adjustable mechanism adjusting the beam arrangement to control seed planting depth.

According to another aspect of the disclosure, an automated depth control adjustment system for a seed planter includes a controller unit. Also included is an electric motor in operative communication with the controller unit to receive a signal therefrom. Further included is an adjustment screw operatively coupled to the electric motor. Yet further included is a beam arrangement operatively coupled to the adjustment screw and adjustable upon rotation of the adjustment screw, rotation of the adjustment screw adjusting the beam arrangement to control seed planting depth.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, an automated depth control adjustment system is provided to assist in seed planting operations.

Figure 1:
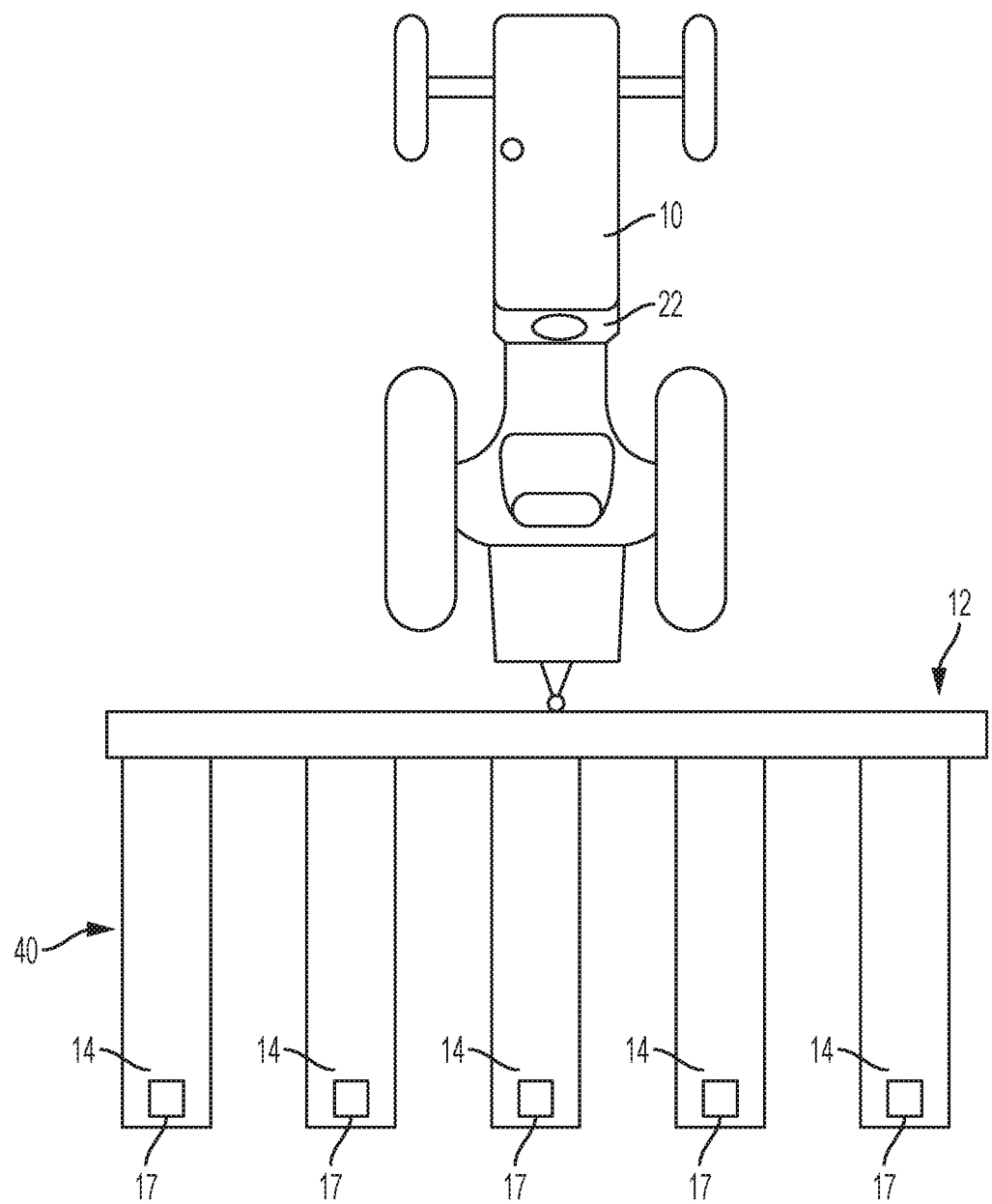
FIG. 1 is a plan view of a tractor towing a planter.

Referring to FIG. 1, schematically illustrated is tractor 10 with a planter 12 hitched thereto. Although not illustrated in detail, the planter 12 comprises a fixed main frame having tires attached thereto for movement along the ground. The planter 12 includes a disc assembly that is used to cut a channel for a seed to be placed. The disc assembly is operatively coupled to a gauge wheel that is used to set ground penetration depth during a seed planting operation. The gauge wheel is provided to follow behind the channel and pack the soil to a desired depth. The gauge wheel is mounted to a beam arrangement 40.

As shown, the planter 12 includes a plurality of row units 14 that are spaced from each other in a lateral direction. Each of the row units 14 translates over the ground and plants seeds at spaced intervals, and to a desired depth, along the direction of travel of the respective row unit. The desired depth is predetermined by an operator. The beam arrangement 40 is mounted to facilitate seed planting depth control.

An adjustable mechanism (shown as adjustment screw 16) is operatively coupled to the beam arrangement 40 and is adjustable to adjust the beam arrangement 40, which controls the seed depth placement by movement of a hard stop feature. When the adjustment screw 16 is fully retracted and the row unit associated therewith is lowered to its planting position, the beam arrangement 40 is adjusted to result in the deepest possible channel being cut for the row unit. Conversely, if the adjustment screw 16 is moved to its fully extended position and the row unit associated therewith is lowered to its planting position, the beam arrangement 40 is adjusted to result in the shallowest possible channel being cut for the row unit.

Rather than requiring manual adjustment of each row unit's planting depth, the embodiments described herein provide an operator the advantages of an automated depth control adjustment system 17. The automated system includes an electric motor 18 (FIGS. 2 and 4) that is position controlled by a controller. A signal is sent from a controller unit 22. In some embodiments the signal sent to the electric motor controller is sent in a wired manner and in alternative embodiments the signal is sent wirelessly. In one embodiment, the controller unit 22 is located onboard the tractor 10 and includes a monitor that the operator may interact with. Such an embodiment may include a touch screen that allows the operator to input commands with. Alternatively, the controller unit 22 may be operated by a wireless device, such as a tablet, laptop computer, cellular phone or the like. Regardless of the specific type of controller unit interface employed, the operator may adjust the depth control of all of the row units from the comfort of the tractor cab or other remote location and in a reliable and efficient manner. In some embodiments, each row unit may be adjusted to the same depth based on a similar signal being sent to each unit. Alternatively, individual rows may be adjusted to different depths with a distinct signal being sent to different rows to affect the respective adjustment screws differently. In this way, adjacent rows may be adjusted differently.

Figure 3:
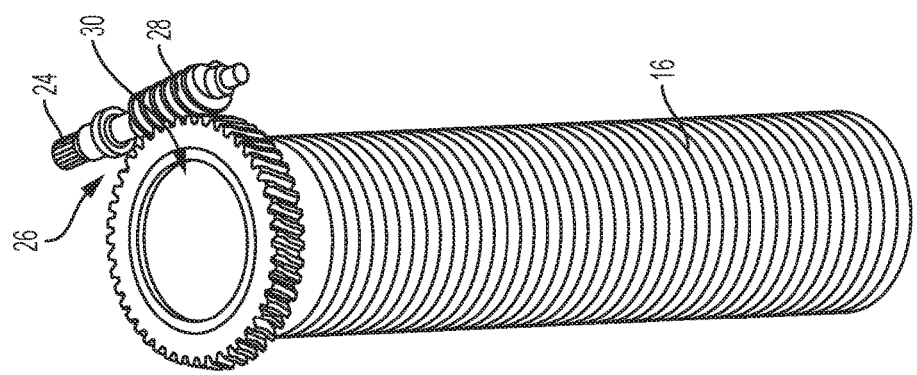
FIG. 3 is a perspective view of a gear arrangement of the automated depth control adjustment assembly.
Figure 2:
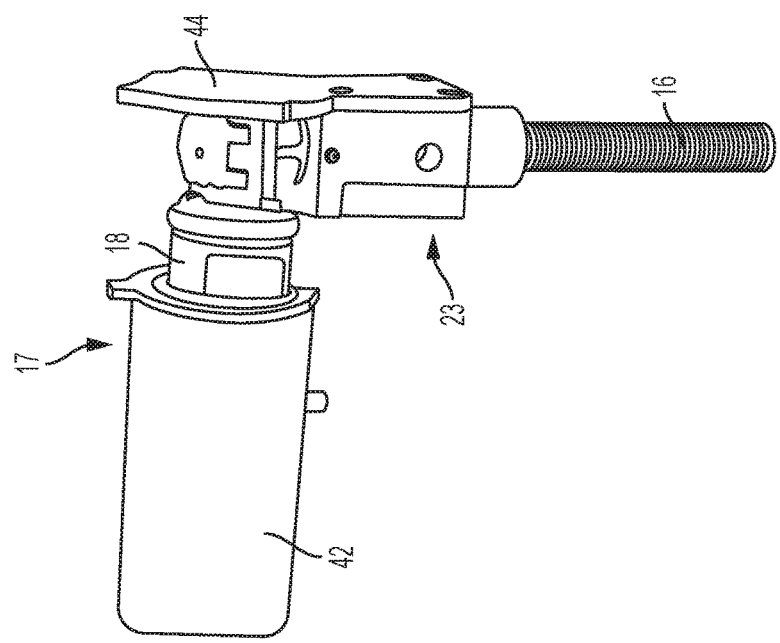
FIG. 2 is a perspective view of an automated depth control adjustment assembly for the planter.
Figure 4:
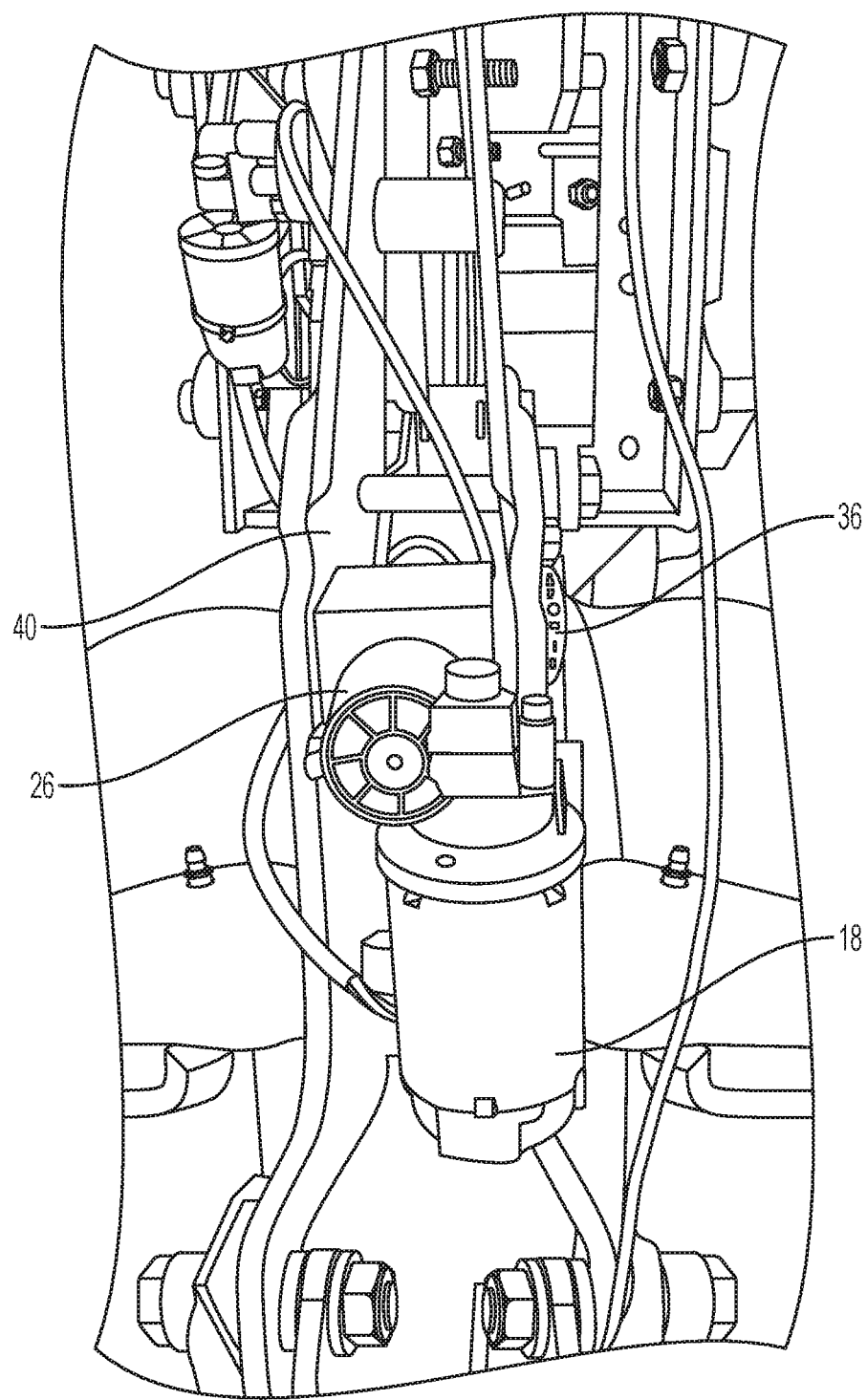
FIG. 4 is a side view of the automated depth control adjustment assembly.

Referring to FIGS. 2-4, the automated depth control adjustment system 17 is illustrated in greater detail. FIGS. 2 and 4 illustrate the automated depth control adjustment system 17 with a housing assembly 23, while the housing assembly 23 is removed in FIG. 3 to better illustrate certain features of the system 17. The electric motor 18 is illustrated and includes an output shaft 24. A cover 42 (FIG. 2) is provided in some embodiments to at least partially surround the electric motor 18, thereby protecting the electric motor 18 from environmental hazards. The particular type of electric motor employed may vary depending upon the particular application, but in some embodiments, the electric motor 18 is a 3-phase, 12 Volt DC motor. Irrespective of the type of motor, the output shaft 24 is operatively coupled to a worm gear arrangement 26 that is non-back drivable to drive the worm gear arrangement 26. More particularly, the output shaft 24 is operatively coupled to a worm 28 of the arrangement 26, which rotates a worm wheel 30 that the worm 28 is engaged with. In some embodiments, the worm gear arrangement is a right angle worm gear drive. The gear ratio of the worm gear arrangement 28 may vary depending upon the particular application, but in some embodiments a 15:1 worm gear box is employed.

The worm wheel 30 is operatively coupled to, or integrally formed with, the adjustment screw 16. As discussed above, adjustment (e.g., compression) of the adjustment screw 16 adjusts the planting depth of seeds or the like by moving the beam arrangement 40 relative to the ground level. Based on threaded engagement between the adjustment screw 16 and an interface of the beam arrangement 40.

In operation, an operator provides an input with the controller unit 22 (FIG. 1) to send a signal to the electric motor 18, which drives the worm gear arrangement 26 to adjust the adjustment screw 16. Rotation of the adjustment screw 16 results in adjustment of the beam arrangement 40.

As shown in FIG. 2, the housing assembly 23 includes one or more portions that surround at least a portion of the gear arrangement 26 and/or at least a portion of the adjustment screw 16. A flange 44 is mounted to the housing assembly 23 in some embodiments for mounting purposes and/or additional protection.

The embodiments described above may be incorporated into existing planters, such that the existing units are merely retrofitted. In such an implementation, an existing depth adjustment gauge 36 may be left to provide visual confirmation of the depth setting.

Advantageously, the automated depth control adjustment system 17 reduces operator time by completely eliminating manual adjustment time required by other planter systems. Furthermore, the opportunity for operator error generally, and particularly between row units, is greatly reduced.

In addition to the above-described embodiments, a down force monitoring feature is included in some embodiments. The down force monitoring feature comprises a strain gauge incorporated onto a threaded shaft collar of the adjustment system described above. The down force pressure is detected by the strain gauge for each individual row unit for monitoring and tracking purposes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An automated depth control adjustment assembly for a seed planter comprising:
   an adjustable mechanism;
   a beam arrangement operatively coupled to the adjustable mechanism and adjustable upon manipulation of the adjustable mechanism;
   an electric motor operatively coupled to the adjustable mechanism to drive the adjustable mechanism, manipulation of the adjustable mechanism adjusting the beam arrangement to control seed planting depth; and
   a gear arrangement operatively coupling the electric motor to the adjustable mechanism, wherein the adjustable mechanism is an adjustment screw and the gear arrangement comprises a worm operatively coupled to an output shaft of the electric motor and a worm wheel, the worm wheel operatively coupled to the adjustment screw.

2. The automated depth control adjustment assembly of claim 1, wherein the gear arrangement comprises a right angle worm gear drive.

3. The automated depth control adjustment assembly of claim 1, further comprising a cover surrounding at least a portion of the electric motor.

4. The automated depth control adjustment assembly of claim 1, wherein the electric motor is a 3-phase, 12 Volt DC motor.

5. An automated depth control adjustment assembly for a seed planter comprising:
   an adjustable mechanism;
   a beam arrangement operatively coupled to the adjustable mechanism and adjustable upon manipulation of the adjustable mechanism;
   an electric motor operatively coupled to the adjustable mechanism to drive the adjustable mechanism, manipulation of the adjustable mechanism adjusting the beam arrangement to control seed planting depth;
   a gear arrangement operatively coupling the electric motor to the adjustable mechanism; and
   a housing at least partially surrounding the gear arrangement, operatively coupling the electric motor to the adjustable mechanism, wherein the housing surrounds at least a portion of the adjustable mechanism.

6. The automated depth control adjustment assembly of claim 5, wherein the gear arrangement comprises a right angle worm gear drive.

7. The automated depth control adjustment assembly of claim 5, further comprising a cover surrounding at least a portion of the electric motor.

8. The automated depth control adjustment assembly of claim 5, wherein the electric motor is a 3-phase, 12 Volt DC motor.

9. An automated depth control adjustment system for a seed planter comprising:
   a controller unit;
   an electric motor in operative communication with the controller unit to receive a signal therefrom;
   an adjustment screw operatively coupled to the electric motor;

a beam arrangement operatively coupled to the adjustment screw and adjustable upon rotation of the adjustment screw, rotation of the adjustment screw adjusting the beam arrangement to control seed planting depth; and a gear arrangement operatively coupling the electric motor to the adjustment screw, wherein the gear arrangement comprises a worm operatively coupled to an output shaft of the electric motor and a worm wheel, the worm wheel operatively coupled to the adjustment screw.

10. The automated depth control adjustment system of claim 9, wherein the controller unit is fixed at an onboard location of a tractor configured to tow the seed planter.

11. The automated depth control adjustment system of claim 9, wherein the controller unit is a portable device.

12. The automated depth control adjustment system of claim 9, further comprising a cover surrounding at least a portion of the electric motor.

13. The automated depth control adjustment system of claim 9, wherein the electric motor is a 3-phase, 12 Volt DC motor.

14. An automated depth control adjustment system for a seed planter comprising:
a controller unit;
an electric motor in operative communication with the controller unit to receive a signal therefrom;
an adjustment screw operatively coupled to the electric motor;
a beam arrangement operatively coupled to the adjustment screw and adjustable upon rotation of the adjustment screw, rotation of the adjustment screw adjusting the beam arrangement to control seed planting depth; and
a gear arrangement operatively coupling the electric motor to the adjustment screw, wherein the gear arrangement comprises a right angle worm gear drive.

15. The automated depth control adjustment system of claim 14, wherein the controller unit is fixed at an onboard location of a tractor configured to tow the seed planter.

16. The automated depth control adjustment system of claim 14, wherein the controller unit is a portable device.

17. The automated depth control adjustment system of claim 14, further comprising a cover surrounding at least a portion of the electric motor.

18. The automated depth control adjustment system of claim 14, wherein the electric motor is a 3-phase, 12 Volt DC motor.

19. An automated depth control adjustment system for a seed planter comprising:
a controller unit;
an electric motor in operative communication with the controller unit to receive a signal therefrom;
an adjustment screw operatively coupled to the electric motor; and
a beam arrangement operatively coupled to the adjustment screw and adjustable upon rotation of the adjustment screw, rotation of the adjustment screw adjusting the beam arrangement to control seed planting depth; and
a housing at least partially surrounding the gear arrangement, wherein the housing surrounds at least a portion of the adjustment screw.

20. The automated depth control adjustment system of claim 19, wherein the controller unit is fixed at an onboard location of a tractor configured to tow the seed planter.

21. The automated depth control adjustment system of claim 19, wherein the controller unit is a portable device.

22. The automated depth control adjustment system of claim 19, further comprising a cover surrounding at least a portion of the electric motor.

23. The automated depth control adjustment system of claim 19, wherein the electric motor is a 3-phase, 12 Volt DC motor.

* * * * *